Figure 1:
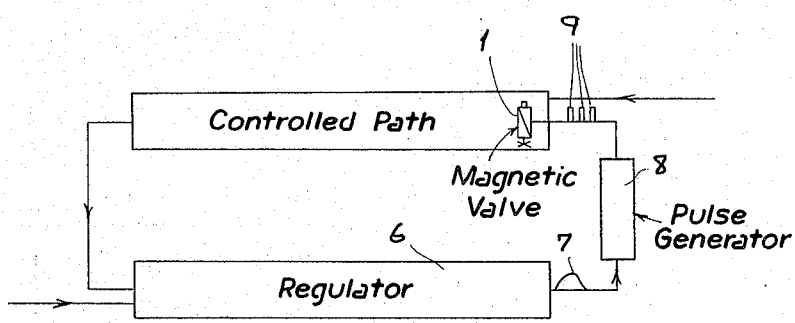

March 7, 1967  G. WEISHEIT  3,307,824
CONTROL SYSTEM FOR FLOWING MEDIA
Filed Sept. 27, 1963  4 Sheets-Sheet 1

Georg Weisheit
INVENTOR.

BY Karl G. Ross
Attorney

March 7, 1967 G. WEISHEIT 3,307,824
CONTROL SYSTEM FOR FLOWING MEDIA
Filed Sept. 27, 1963 4 Sheets-Sheet 2

Georg Weisheit
INVENTOR.

BY Karl J. Ross
Attorney

United States Patent Office
3,307,824
Patented Mar. 7, 1967

3,307,824
CONTROL SYSTEM FOR FLOWING MEDIA
Georg Weisheit, Trappenbergstrasse 37,
Essen-Stadtwald, Germany
Filed Sept. 27, 1963, Ser. No. 312,142
Claims priority, application Germany, Sept. 29, 1962,
W 33,034
4 Claims. (Cl. 251—131)

Control circuits for the regulation of fluent mediums with regard to pressure, temperature, quantity, velocity and the like, in most cases, operate with electric mechanisms for measuring the controlled condition as well as with an electric regulator to compare the required value and the actual value and to generate the control signals; the systems, however use a hydraulically or pneumatically, i.e., by auxiliary energy, controlled diaphragm- or piston-valve. This is highly expensive because of the transformation of the electric power to hydraulic and pneumatic power respectively and because of the need to provide particular hydraulic or pneumatic systems with compressors, etc., and often it is from the point of view of a control engineer not sufficiently precise because of dead-times. In fact, the operating time of such known control circuits is unsatisfactory. Owing to these disadvantages one has tried many times to use electrically controlled valves which may be operated directly by the pilot signals or "error" of the comparison means. Particularly, there have been attempts to use magnetic valves. Magnetic valves in most cases are balanced valves having an electromagnet as well as a readjusting spring as motor operator; magnetic valves having one electromagnet for each of both directions of movement are also known. The pilot signals supplied by the regulator to such magnetic valves are in most cases continuously produced D.C.-signals, the potential or voltage of which varies according to the deviation. Attempts to equip control circuits with such magnetic valves in practice were without any practical effect. On the one hand, such control circuits do not operate with the necessary accuracy and, on the other hand, such control circuits cannot be adapted to all control needs such as proportional control, integral control, proportional-integral control, differential operation and the like. The same holds true where the magnetic valves are equipped with hydraulic or pneumatic brakes, in which case the valve spindle is generally connected to a piston or a diaphragm which divides an associated cylinder or an associated diaphragm chamber, respectively, this, according to the movement of the piston or of the diaphragm, the hydraulic medium, contained within said diaphragm chamber or the cylinder respectively can flow through a throttle from one chamber into the other. Embodiments with an electric motor as operator means for the valve have the same disadvantages. In this case too the known systems are not adapted to solve all control problems.

The object of the present invention is therefore to provide a control circuit which is operated fully electrically, without any auxiliary energy, which is substantially free of any dead-time and which permits any desired control mode, such as proportional control, integral control, proportional-integral (P.I.) control as well as control with differential influence.

The present invention relates particularly to a control circuit for the regulation of flowable media having a magnetic valve as an electrically operated final control element and an electric regulator operating said magnetic valve by pilot or "error" signals. The present invention is characterized in that the pilot signals are transformed into pulses of different width and/or frequency and/or pulse rate by means of a pulse generator and in that these control pulses are fed to the magnetic valve. The control pulses coming from the regulator provide a measure of the deviation (or disturbance or reference input and the like).

The present invention is based on the surprising discovery that there may be found by trial for each magnetic valve and for any given control problem, a level of electric-pulse in width and power to which the valve responds with gradual regulation so that by variation of the pulse power and/or pulse width and/or pulse repetition rate any degree of valve response operating speed or any operating path may be effected. Particularly it is possible to adapt for example the characteristic curve of the valve operation against time to the curve showing the desired variation of the required operation value against time exactly or substantially exactly, by small steps or increments. Therefore it can be said that the control circuit according to the present invention has an ideal operating characteristic. Within the scope of the present invention the control pulses have essentially the same current amplitude.

In detail the present invention may be carried out in different ways. So, a preferred embodiment of the invention is characterized in that a pulse generator is provided between the regulator and the magnetic valve in the form of a Schmitt trigger with pulse amplifier and that the Schmitt trigger is controlled by a feed back from the magnetic valve in such manner that it is operated only during movement of the valve member from rest position to the required value position. The Schmitt trigger and the regulator respectively preferably are provided with a bridge having in two bridge networks a resistance adjustable according to the required value and a resistance adjusted according to the deviation as well with a potentiometer having a central tap in the bridge diagonal adjustable by the feed back, the Schmitt trigger lying in the bridge diagonal. To effect a proportional control by the control circuit according to the invention (where the magnetic valve normally acts integrally), or in order to admit differential influences, the present invention proposes to provide additionally in the bridge diagonal a network with a proportional member and a differential member respectively.

In the control circuit according to the present invention the control pulses may operate the magnetic valve directly or by a relay which does not change the principle in any way. The magnetic valve itself may be equipped with an electromagnet having an electromagnetically moved core and with a readjusting spring, the core of said electromagnet as well as said readjusting spring operating the valve spindle.

However, it is also possible, to associate the magnetic valve with a particular damping device as described hereinbefore. Furthermore, according to a preferred embodiment of the invention the pulse generator is connected to the valve so that the completed valve system can be installed in any desired and existing control circuit having an electric regulator. The invention will, at all events, be well understood with the aid of the following description as well as of the accompanying drawings, which description and drawings are, of course, given only by way of example.

Figure 2:
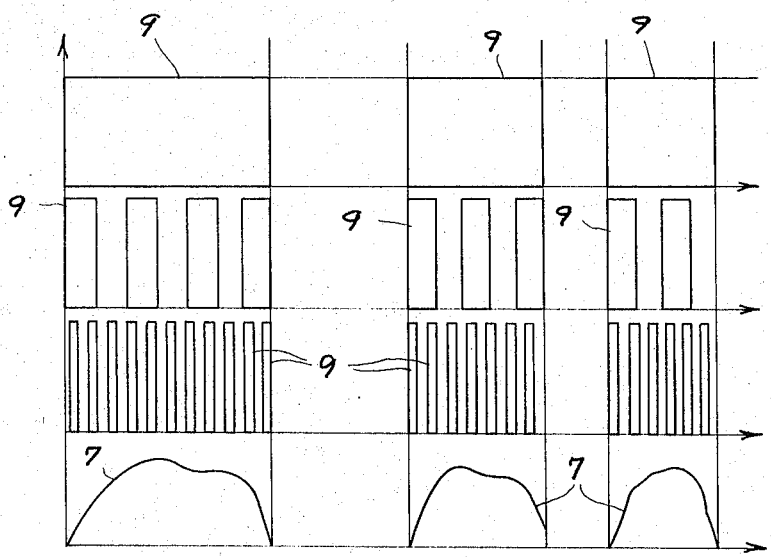
Figure 3:
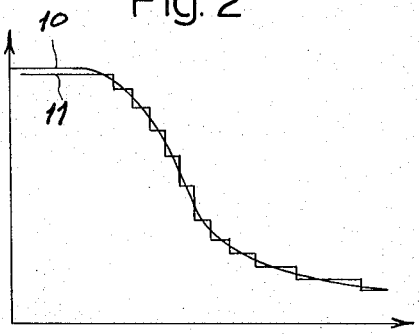

In the drawing:
FIGURE 1 shows a control circuit according to the present invention,
FIGURE 2 shows diagrammatically the transformation of the pilot signals into control pulses according to the invention,
FIGURE 3 is a graph of the time characteristic of a control-circuit according to the present invention,
FIGURE 4 shows details of a switching circuit for a control system of the type shown in FIGURE 1,
FIGURE 5 shows switching details of the Schmitt trigger of the circuit of FIGURE 4, and FIGURE 6 shows an axial section of a magnetic valve adapted to be used in the system of the present invention.

Figure 4:
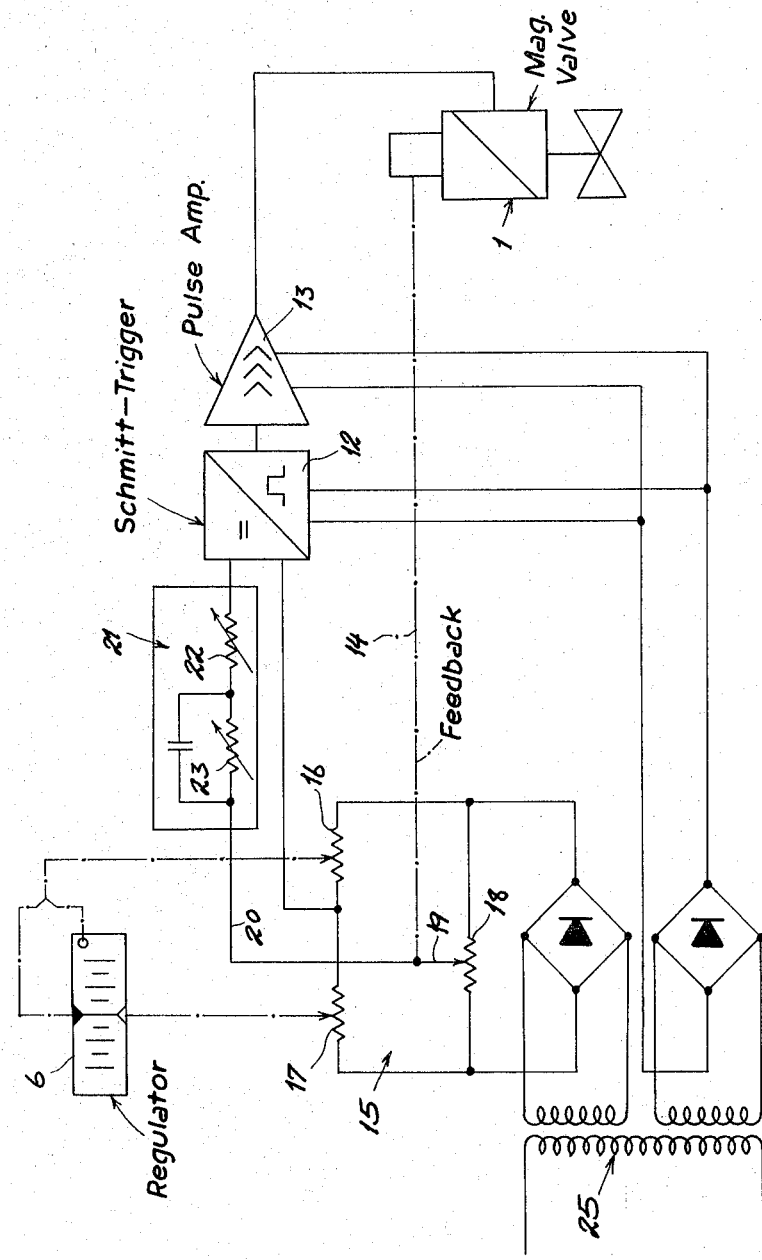

The control-circuit shown in the drawings serves to control streaming mediums and operates with a magnetic valve 1 schematically indicated in FIGS. 1 and 4. Such a valve as shown in FIG. 6, in its general construction of the valve body 2 and of the motor operator 3 in the form of an electromagnet with electromagnetically moved core, associated commonly with a readjusting spring 4 and if necessary with a damping member 5. Such a magnetic valve is therefore an electrically operated regulating unit. This is operated by the regulator 6 with relatively continuous pilot signals 7. According to the present invention, these pilot signals are transformed by means of a pulse generator 8, as described in detail hereinafter, to control pulses 9 of different intensity and/or repetition and/or number, the control pulses being applied to the magnetic valve 1. In FIG. 2 I show how a pilot signal, indicated by the curve or envelope 7, can be transformed to pulses 9 of different intensity, number, repetition rate and width respectively. Thus it is possible to choose by trial, without any difficulty for each magnetic valve pulses in width and intensity to which the valve responds by gradual regulation. In FIGURE 3 there is indicated that it is possible selectively to effect any desired operating speed or any desired operating path in such manner that the curve 10, indicating the actual position of the valve in the time, approximates the curve 11, indicating the desired variation of the required value with time, exactly or substantially exactly, i.e., it follows this curve step by step with few little deviation. The pulse-repetition rate for the usual regulating problems is within the range of some pulses per sec. up to, in some cases, hundreds and more pulses per sec.

Figure 5:
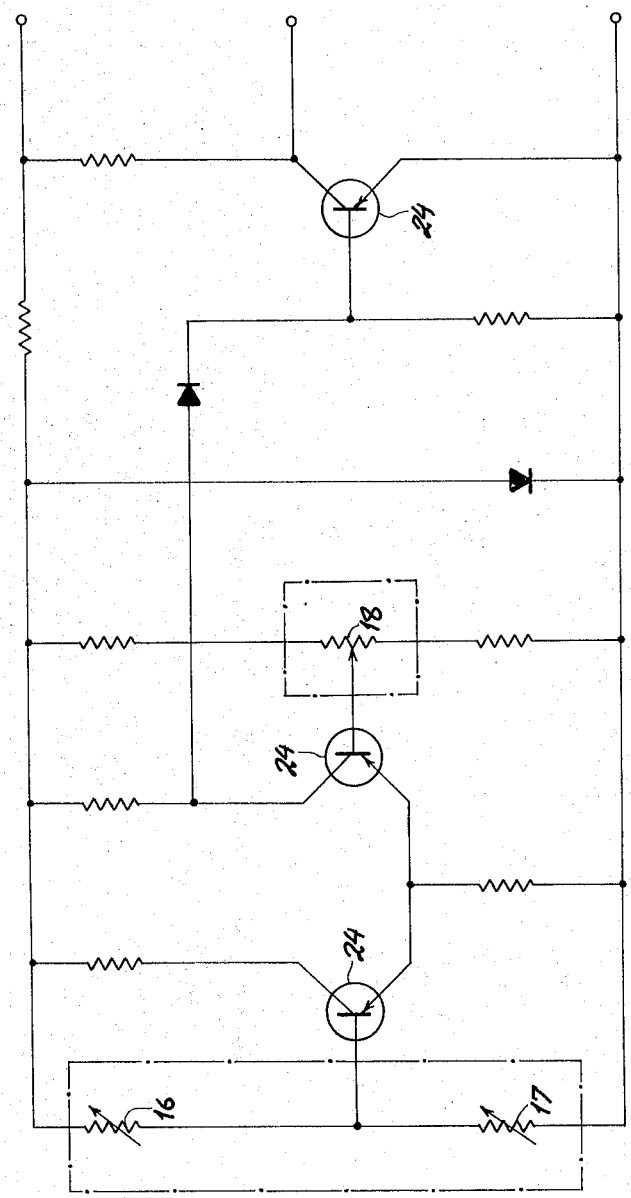
Figure 6:
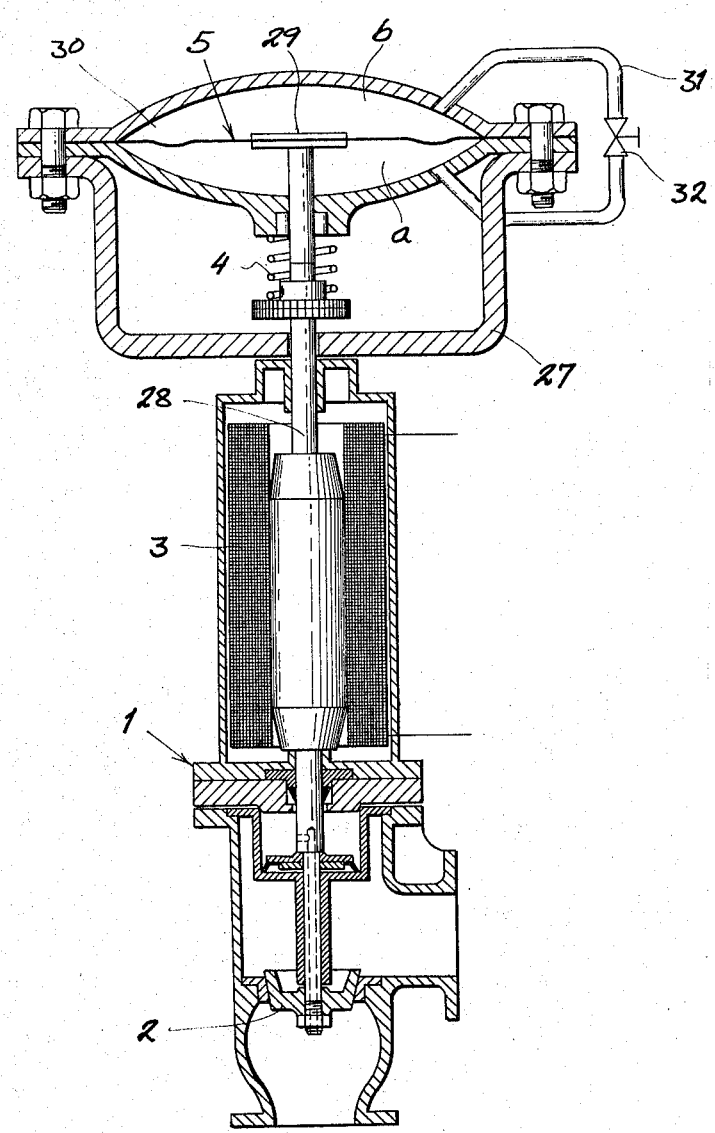

Details of a suitable control circuit according to the invention are made clear in FIGURES 4 and 5. In this embodiment there is shown between the regulator 6 and the magnetic valve 1 a Schmitt trigger 12 and a pulse amplifier 13, the Schmitt trigger 12 being controlled by means of the feed back 14 from the magnetic valve 1 in such a manner that it is operated only during movement of the valve member from the rest position of the magnetic valve to the position of required value whereas the Schmitt trigger does not react within a range at permissible deviation at the required-value position. A Schmitt trigger arrangement and a discussion thereof may be found in Basic Theory and Application of Transistors, U.S. Government Printing Office, 1958 (pages 208–210) and in any conventional text in the field; see also Handbook of Selected Semiconductor Circuits, U.S. Government Printing Office, 1960 (pages 6–63 to 6–65). The feed back is made for example mechanically by means of a link with a resistance. This is valid for the open- and the closed-positions respectively when two required-value regulators are provided. For this purpose there are coupled together the regulator 6 and the Schmitt trigger 12 respectively via a bridge 15. Said bridge 15 has a resistance 16 adjustable according to the required value and a resistance 17 adjusted according to the deviation in control in respective bridge networks, as well as a potentiometer 18 with a central or wiper terminal 19 of the bridge diagonal 20 adjustable by the feed back 14, the Schmitt trigger lying in the bridge diagonal 20. The feed back 14 is effected for example, by means of mechanical devices known per se. Furthermore there is provided in the bridge diagonal 20 a network 21 with a proportional member (e.g. a variable resistance) 22 and a differential member 23 (e.g. and R–C differentiator) (Transients and Waveforms, U.S. Government Printing Office, 1962, pages 65 to 68), respectively in order to be able to use the control circuit for proportional controls or for controls with differential influence. In the embodiment shown in the drawing the control pulses are applied directly to the magnetic valve 1, but it is also possible to interpose an electronic or a mechanical relay.

The switching of the Schmitt trigger is clearly to be seen from FIGURE 5 so that it is not necessary to described this conventional circuit in detail. There are used transistors 24.

The device according to the present invention as shown in FIGURES 4 and 5 operates as follows:

As can be seen from the diagrams one branch of the resistance bridge 15 is established by the resistances 17, 16 and the other branch is established by the potentiometer 18 having the aforementioned variable central tap. By means of the variable resistance 16 the required value is set selectively, whereas the resistance 17 is varied according to the deviation in control (i.e., the control parameter) in a known manner. The bridge 15 is supplied with direct current from the transformer 25 and the rectifier 26 and is balanced and its diagonal 20 is currentless when both partial resistances of the potentiometer are in the proportion to each other as said resistances 16 and 17. The Schmitt trigger 12 thereby is without control current and does not effect any current passage to the magnet 3 through the intensifier 13. By virtue of the aforementioned mechanical feed back between the core of the electromagnet and the central wiper of the potentiometer 18, the bridge diagonal 20 delivers a control current to the Schmitt trigger 12 from the rest position of the magnet up to its required value position, which current terminates upon the core attaining the present required value. Within the range of the required value position, i.e., of the closed- or open-position of the magnetic valve the zero-point amplifier does not respond. In the case of such a control current the Schmitt trigger is excited and effects a sudden "flip" or switch over. In the same manner the pulse amplifier 13 is rapidly connected in circuit with the magnet 3 of the magnetic valve 1 and the latter consequently receives the full starting current. The core of the magnet leaves its rest position and is shifted to the required value position. In this position the Schmitt trigger 12 is no longer excited and returns to its rest or quiescent ("flip") condition, so that the magnet 3 of the magnetic valve 1 also becomes dead through the pulse amplifier 13. According to the high sensibility of the Schmitt trigger 12 it is already excited again after a short return movement and the electromagnet 3 of the magnetic valve 1 receives again current. The magnet pulls again and the cycle is repeated in the same rhythm, the magnet always readjusting itself to the level required by the proportion of resistance 16 to resistance 17.

The construction of the magnetic valve according to the present invention is to be seen from FIGURE 6. Within the valve box 27 there is provided as usual the valve body 2 which is mounted in balance. The valve spindle 28 extends beyond the wall of said valve box 27 and is connected to the core of an electromagnet 3 attached to this valve box 27. The core of said electromagnet 3 again projects with an extension into the damping device 5, which however may be absent. In the embodiment according to the present invention shown in FIGURE 6 said device comprises a piston 29 which divides the cylinder chamber 30 in two spaces "a" and "b," spaces which however are connected to each other through a by-pass channel 31 having a throttle 32 inserted therein. Thus the movement of the core of the electromagnet and therefore the movement of the valve is braked in accordance with the setting of the throttle 32. In a similar way the damping device may also operate with a diaphragm. The elements for the feed back are not indicated in this figure. They may be disposed directly on the valve. Thereby it is possible without fail to effect optimal accuracy.

What I claim is:

1. In a system for the control of a fluid medium having a regulator circuit responsive to a parameter of the flowing medium, in combination:

an electromagnetically operable valve having a valve element for controlling the flow of said medium, shiftable between a rest position of said valve and at least one control position, at least one electromagnet member and a core member co-operating with said electromagnet member, one of said members being connected with said element for shifting same upon energization of said electromagnet member and being movable with said element, and damping means coupled with said valve elements for damping oscillations thereof;

an electronic triggering circuit connected between said regulator circuit and said electromagnet member for energizing said electromagnet member with a succession of pulses in one condition of said triggering circuit and de-energizing said electromagnet member in another condition of said triggering circuit; and feedback means operable by said valve element and connected with said triggering circuit for switching same into said one condition to displace said element from said rest position to said control position and thereafter switching said triggering circuit to said other condition.

2. The combination defined in claim 1, further comprising a resistance bridge having a diagonal and a pair of arms connected across a direct-current source, said bridge comprising a first variable resistor in one of said arms selectively settable to establish a desired value of said parameter and a corresponding location of said valve element at said control position, said regulator circuit including a second variable resistor in the other arm of said bridge and operable in response to fluctuation in said parameter, said diagonal including a potentiometer connected between said arms and having a wiper constituting said feedback means and connected in circuit with said triggering circuit.

3. The combination defined in claim 2 wherein the diagonal of said bridge includes a resistance-capacitance differentiation network.

4. The combination defined in claim 3 wherein the diagonal of said bridge includes a proportioning circuit element.

References Cited by the Examiner

UNITED STATES PATENTS

| 2,501,583 | 3/1950 | Schafer | 251—131 X |
| 2,655,940 | 10/1953 | Jackson | 251—30 X |

FOREIGN PATENTS

| 1,019,565 | 10/1952 | France. |
| 1,280,216 | 11/1961 | France. |

M. CARY NELSON, *Primary Examiner.*

A. ROSENTHAL, *Assistant Examiner.*